United States Patent [19]

Champa et al.

[11] Patent Number: 4,819,972
[45] Date of Patent: Apr. 11, 1989

[54] GRIP JOINTS FOR PLASTIC DUCTS

[76] Inventors: Gary Champa, Rte. I, Box 237A, Bunker Hill, Ill. 62014; Joseph E. Jones, 225 Riverwoods Cove, East Alton, Ill. 62024

[21] Appl. No.: 45,206

[22] Filed: May 4, 1987

Related U.S. Application Data

[63] Continuation of Ser. No. 816,792, Jan. 7, 1986, abandoned.

[51] Int. Cl.⁴ ............................................. F16L 25/00
[52] U.S. Cl. .................................. 285/331; 285/423; 285/903
[58] Field of Search .............. 285/331, 200, 921, 390, 285/110; 138/120, 155, DIG. 4, 126, 162, 164, 166, 168; 24/16 PB

[56] References Cited

U.S. PATENT DOCUMENTS

| | | | |
|---|---|---|---|
| 1,904,675 | 4/1933 | Boyer | 285/390 |
| 2,260,221 | 5/1941 | Gray . | |
| 3,246,918 | 4/1966 | Burghart | 285/331 X |
| 3,512,805 | 5/1970 | Glatz | 285/331 X |
| 3,757,031 | 9/1973 | Izraeti | 138/162 X |
| 3,805,845 | 4/1974 | Santoro . | |
| 3,812,659 | 5/1974 | Westergren et al. | 285/319 X |
| 3,836,181 | 9/1974 | Kelver . | |
| 3,933,406 | 1/1976 | Cameron et al. | 285/921 X |
| 4,046,409 | 9/1977 | Virgin . | |
| 4,214,351 | 7/1980 | Wenk | 24/16 PB |
| 4,294,476 | 10/1981 | Nash . | |
| 4,304,423 | 12/1981 | Nez . | |
| 4,317,471 | 3/1982 | King | 285/921 X |
| 4,441,745 | 11/1983 | Nicholas | 285/903 X |
| 4,484,769 | 11/1984 | Lacey | 285/331 X |
| 4,502,186 | 3/1985 | Clarke | 24/16 PB |

FOREIGN PATENT DOCUMENTS

| | | | |
|---|---|---|---|
| 253088 | 5/1963 | Australia | 285/331 |
| 46110 | 10/1961 | Denmark | 285/331 |
| 1475807 | 9/1969 | Fed. Rep. of Germany | 285/110 |
| 392170 | 9/1965 | Switzerland | 285/331 |

OTHER PUBLICATIONS

ACME Manufacturing Co. sales brochure for flexible polyester air duct systems.
Product information sheet for Bede Industries, Inc. clothes dryer vent conduits.
Harvel Plastics, Inc. Standard Specification Sheet for Thermoplastic Duct.
Article entitled, "Industrial and Institutional Applications for Thermoplastic Fume Exhaust Systems".
Standard specification sheet for rigid polyvinyl chloride duct.
Copy of Refrigerator Clamp Part.

Primary Examiner—Dave W. Arola
Attorney, Agent, or Firm—Senniger, Powers, Leavitt and Roedel

[57] ABSTRACT

A duct joining system for sealingly connecting plastic gas-conveying ducts is provided. The joining system comprises a receptacle attached to an end of a first duct and sealingly fastened thereto. The receptacle has a size and configuration which is adapted to mate with an end of a second duct. The second duct has a grippable surface extending along its length. The interior of the receptacle contains releasable gripping means and a sealing gasket. The gripping means engages with the surface of the second duct in order to urge the end of the second duct into sealing contact with the gasket.

1 Claim, 3 Drawing Sheets

GRIP JOINTS FOR PLASTIC DUCTS

This application is a continuation of application Ser. No. 816,792, filed Jan. 7, 1986, and now abandoned.

BACKGROUND OF THE INVENTION

1. Field of the Invention

The present invention relates to gas conveying duct joints and, more particularly, to joints for plastic ducts.

2. Description of the Prior Art

Typically, ducts for central furnace and air conditioning units and the like are formed of sheet-metal. However, there are several disadvantages to using sheet-metal ducts. First, sheet-metal is susceptible to rust and corrosion. Second, sheet-metal conducts electricity. Third, sheet-metal does not take paint easily. In addition, sheet-metal has a relatively low insulation value (R value) and is relatively heavy.

Furthermore, the joining of sheet metal ducts in a secure and air-tight manner has been a constant problem in the prior art. Numerous U.S. patents disclose complex sheet metal duct joining brackets. See, for example, U.S. Pat. Nos. 2,260,221; 3,805,845; 3,836,181; 4,046,409; 4,294,476; and 4,304,423. Thus, there has been a strong need in the art for a new type of air duct, as well as a method of joining same, obviating the need for such complicated joining brackets.

Furthermore, when installing air ducts in buildings, for example, the ducts are typically cut to odd lengths in order to accommodate the particular room configuration and dimensions. Thus, there has been a strong need in the art for a duct joining system which can accommodate ducts of standard length as well as ducts of odd sized lengths.

Recognizing the deficiencies of metal ducts used for corrosive fume handling systems, Harvel Plastic, Inc. of Easton, Pa. has designed a exhaust system using plastic ducts. The Harvel system utilizes ducts composed of polyvinyl chloride (PVC) and having a round or rectangular cross-section. The plastic ducts are fitted with PVC gaskets and thermally welded joints. Flexible connections are welded, cemented or clamped with stainless steel bands. However, this type of joint between plastic ducts fails to allow for thermal expansion and contraction of the duct. Moreover, thermally welded joints frequently have insufficient reinforcement and strength. Also, these ducts require the use of cumbersome tools such as welding guns for their installation.

SUMMARY OF THE INVENTION

Thus, it is an important object of the present invention to provide a plastic duct system which can expand and contract without impairing the seal between adjacent ducts.

A further object of the invention is to provide a strong, yet lightweight, duct system.

A further object of the present invention is to provide a plastic duct system which can be easily installed without the use of complex and expensive installation equipment.

These and other objects which will become readily apparent to those skilled in the art are accomplished by the present invention which comprises a method of joining plastic ducts. The joint comprises a receptacle sealingly fastened to the end of the first duct. The receptacle has a size and configuration adapted to mate with the end of the second duct to be joined. The second duct has a grippable surface extending along its length. The receptacle has releasable gripping means and a resilient sealing material contained therein. In one embodiment of the present invention, the releasable gripping means comprise rows of teeth which engage corresponding rows of ridges provided on the exterior surface of the ducts. The gripping means engages with the ridged surface of the second duct to urge the end of the second duct into sealing contact with the resilient sealing material in order to create an air-tight joint connection.

In a preferred embodiment of the present invention, the rows of ridges are provided along the entire exterior surface of the second duct. In this way, the second duct may be cut to any desired length and still be adapted to be joined according to the methods disclosed herein. The gripping teeth on the interior walls of the receptacle securely hold onto the ridges of the other duct, thus, maintaining a tight joint between the adjacent ducts, even during thermal contraction and expansion of the ducts. Additionally, the U-shaped cross-section of the receptacle provides reinforcement for the joint, thus creating a stronger connection.

Figure 1:
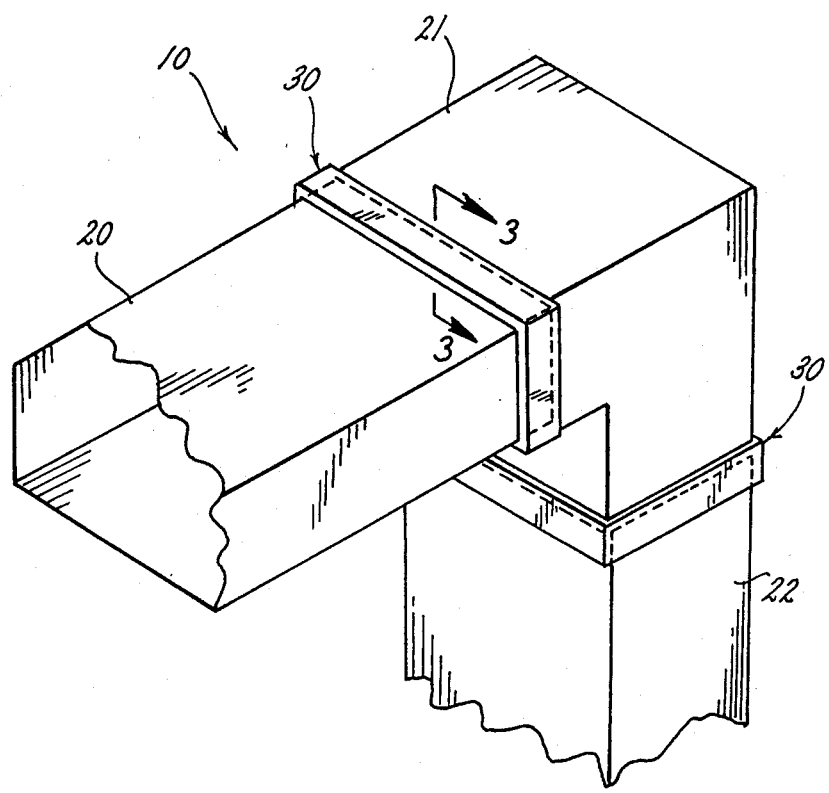
FIG. 1 is a perspective view of three pieces of duct and two duct joints illustrating one embodiment of the present invention.

Although specific embodiments of the present invention have been selected for illustration in the drawings, and although specific terminology will be resorted to in describing those embodiments herein, it will be understood by those skilled in the art that these are merely examples of the scope of the present invention which is defined in the appended claims.

DESCRIPTION OF THE PREFERRED EMBODIMENTS

In the figures, like numerals are used to indicate like elements in the several drawings. A preferred embodiment of the duct joining system of the present invention is illustrated in FIG. 1 and generally designated as 10. Duct joining system 10 comprises ridged plastic ducts 20, 21 and 22 connected to one another so as to form a continuous air-tight conduit. Of course, it will be readily understood that many more ducts may be joined as required. Each pair of adjacent ducts are connected by grip joints 30. Grip joints 30 extend around the entire circumference of the ducts.

Figure 2:
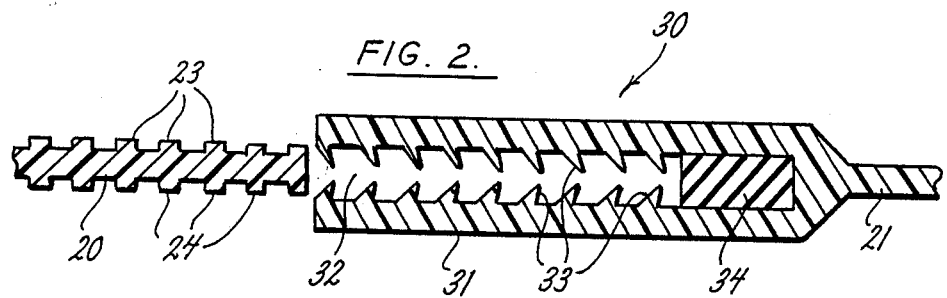
FIG. 2 is a side sectionaal view of the duct joint illustrated in FIG. 3, shown in an open/unassembled condition.
Figure 3:
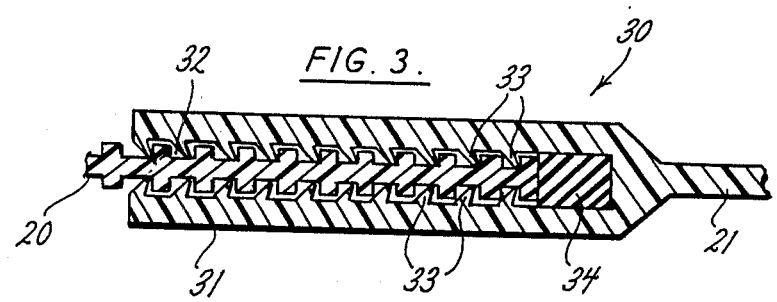
FIG. 3 is a side sectional view of a portion of the duct joint shown in FIG. 1.

Referring to FIGS. 2 and 3, each grip joint 30 includes a receptacle 31 extending from the end of a duct. Receptacle 31 may be fastened to duct 21 in any number of ways. In the embodiments shown in FIGS. 2–4, the receptacle 31 is formed as an integral extension of the end of duct 21. However, other means of securing receptacle 31 to duct 21 (such as by glueing or by heat-sealing) are appropriate as long as the means retains the air-tight seal between the receptacle 31 and duct 21.

Receptacle 31 has a slot 32 for accommodating the end of duct 20. The interior walls of receptacle 31 have a plurality of teeth 33 extending inwardly into the slot 32. The teeth 33 may extend at an angle slightly off perpendicular (with respect to the walls of receptacle 31) in order to facilitate the gripping action in a manner to be further described below. A sealing gasket 34, composed of a resilient sealing material such as neoprene foam rubber, or the like, is affixed to the base of the slot 32. Gasket 34 will be compressed when the duct 20 is inserted and helps to assure a substantially fluid-tight seal within system 10, as shown in FIG. 3. Gasket 34 may be secured onto the base of receptacle 31 by any number of suitable means such as adhesives, heat fusing, etc.

As is clearly shown in FIGS. 2 and 3, a plurality of ridges 23 is provided on the exterior surface of duct 20. Similarly, a plurality of ridges 24 is provided on the interior surface of duct 20. Ridges 23, 24 are adapted to engage teeth 33 provided within receptacle 31 when the end of duct 20 is inserted into receptable 31. The grip joint 30 allows for expansion and contraction due to thermal affects because of the slight "give" inherent in the materials from which the teeth 33, ridges 23, 24, receptacle 31, and gasket 34 are made.

As shown in FIG. 1, ducts 20, 21 and 22 typically have a rectangular cross-sectional shape. However, it is within the scope of the present invention to provide joints for ducts having any number of cross-sectional shapes including circular, semi-circular, oval, square, triangular, rectangular and others. It is sufficient in order to join ducts according to the present invention that the grip joints 30 have the same shape and configuration as the end of the duct 20 being inserted. Thus, in the case of rectangular ducts, the duct is simply cut along a plane perpendicular to the duct axis. The end of the duct is then simply inserted into receptacle 31 until the end of the duct 20 abuts against gasket 34 as shown in FIG. 3. Thus, only an ordinary hand saw is needed to cut and assemble joints according to the present invention. Moreover, the grip joint is easily released by simply inserting numerous wooden wedges or the like between the ridges 23, 24 and the teeth 33 to pry open the receptacle 31 and release the duct 20.

Figure 4:
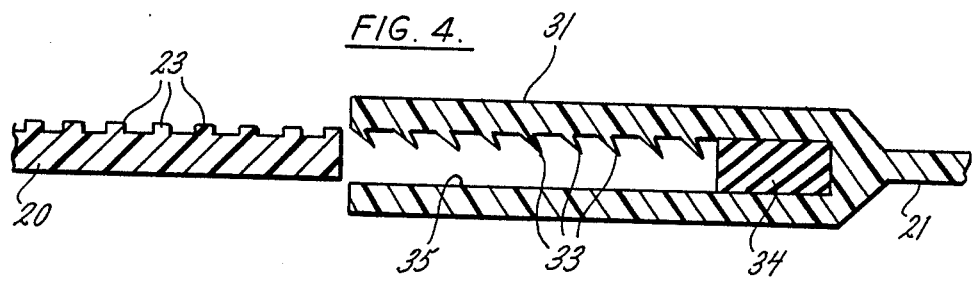
FIG. 4 is another embodiment of a joint according to the present invention, shown in the open/unassembled condition.

FIG. 4 illustrates a further embodiment of the present invention which utilizes a single set of ridges 23 on the exterior surface of duct 20. Similarly, teeth 33 are provided only on one interior wall of receptacle 31 to engage with the corresponding ridges 23. The remaining interior wall of receptacle 31 is provided with a flat surface 35.

Figure 5:
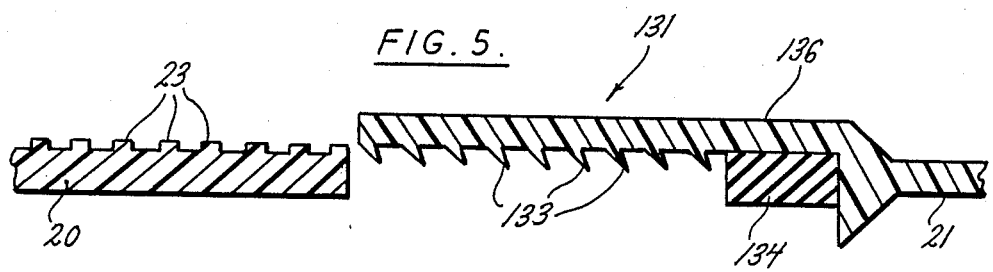
FIG. 5 is a side sectional view of a duct joint in an open/unassembled condition, illustrating another embodiment of the invention.
Figure 6A:
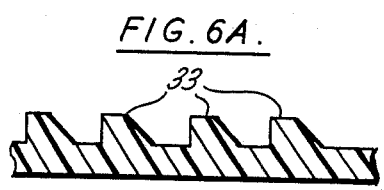
FIG. 6A–6E are side sectional views of gripping teeth illustrating several embodiments of the invention.
Figure 6B:
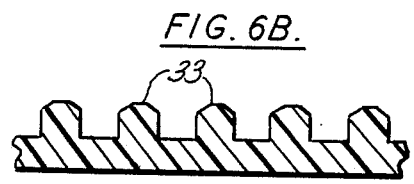
Figure 6C:
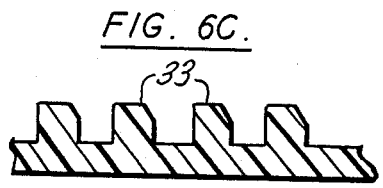
Figure 6D:
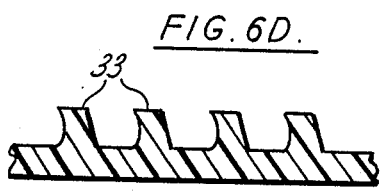
Figure 6E:
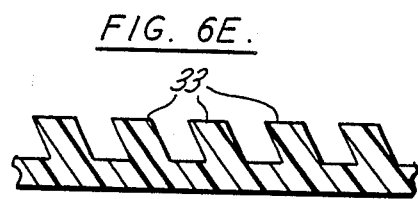

FIG. 5 illustrates a further embodiment of the present invention which utilizes a modified L-shaped receptacle 131. The receptacled 131 has teeth 133 projecting inwardly from its single longitudinal arm 136. Similarly, a single set of ridges 23 are provided on the outside of duct 20. The engagement of teeth 133 and ridges 23 is sufficient to securely join the ducts 20, 21. Alternatively, ridges 25 may be formed on the inside of the duct 20 to similarly engage with teeth 133.

The duct joining system of the present invention may be utilized with plastic ducts of all types and compositions including, but not limited to, polyvinylchloride, polyethylene, polypropylene, polyesters, polyamides, and others.

The number of gripping teeth provided within the receptacle 31 may be determined according to the strength requirements of gripping joint 30. In most gas conveying applications, the provision of at least two rows of teeth 33 within the receptacle 31 is sufficient. However, in applications requiring greater joint strengths, it may be desirable to utilize ten or more rows of gripping teeth 33. Additionally, the teeth may project at any angle from approximately 30°-90°. Typically, however, the teeth will project at a 45° angle with respect to the walls of receptacle 31. Further, the teeth need not be of a triangular cross-section. It is contemplated that the teeth may have many cross-sections, as illustrated in FIGS. 6A-6E, such as: trapezoidal, rectangular with bevels at both projecting corners, rectangular with a rounded projecting corner, rounded trapezoidal, parallelogram-shaped, or the like. Typically, the teeth will have radii of 1/32" to ¼".

Although the present invention has been described in connection with specific embodiments thereof, it will be appreciated by those skilled in the art that a wide variety of equivalents may be substituted for the specific parts shown, all without departing from the spirit and scope of the invention as defined in the appended claims.

We claim:

1. A continuous air-tight conduit system for use in heating and cooling systems in buildings comprising:
    a plurality of connected rigid plastic gas-conveying ducts of standard length, the length of the conduit being adjustable to other than a multiple of said standard length, each of said ducts having an interior and an exterior surface, a receptacle integral therewith at one end thereof and the remainder of the duct having a substantially uniform cross-section and grippable means on the exterior and interior surfaces extending along the entire length thereof, said receptacle having a size and configuration for mating with the end of another one of said ducts, wherein the receptacle has a circumferential slot therein, the slot being engageable with the end of another duct, and wherein the slot has a plurality of rows of releasable gripping means formed therein, said gripping means being directly engageable with the grippable means on said interior and exterior surface when the ducts are joined; and
    the length of at least one of said ducts being shortenable by cutting the duct at an angle substantially perpendicular to the duct axis along the portion of uniform cross-section and grippable means to form a cut end, the cut end being engageable with the receptacle of another duct to form a connection therebetween.

* * * * *